Patented Jan. 14, 1941

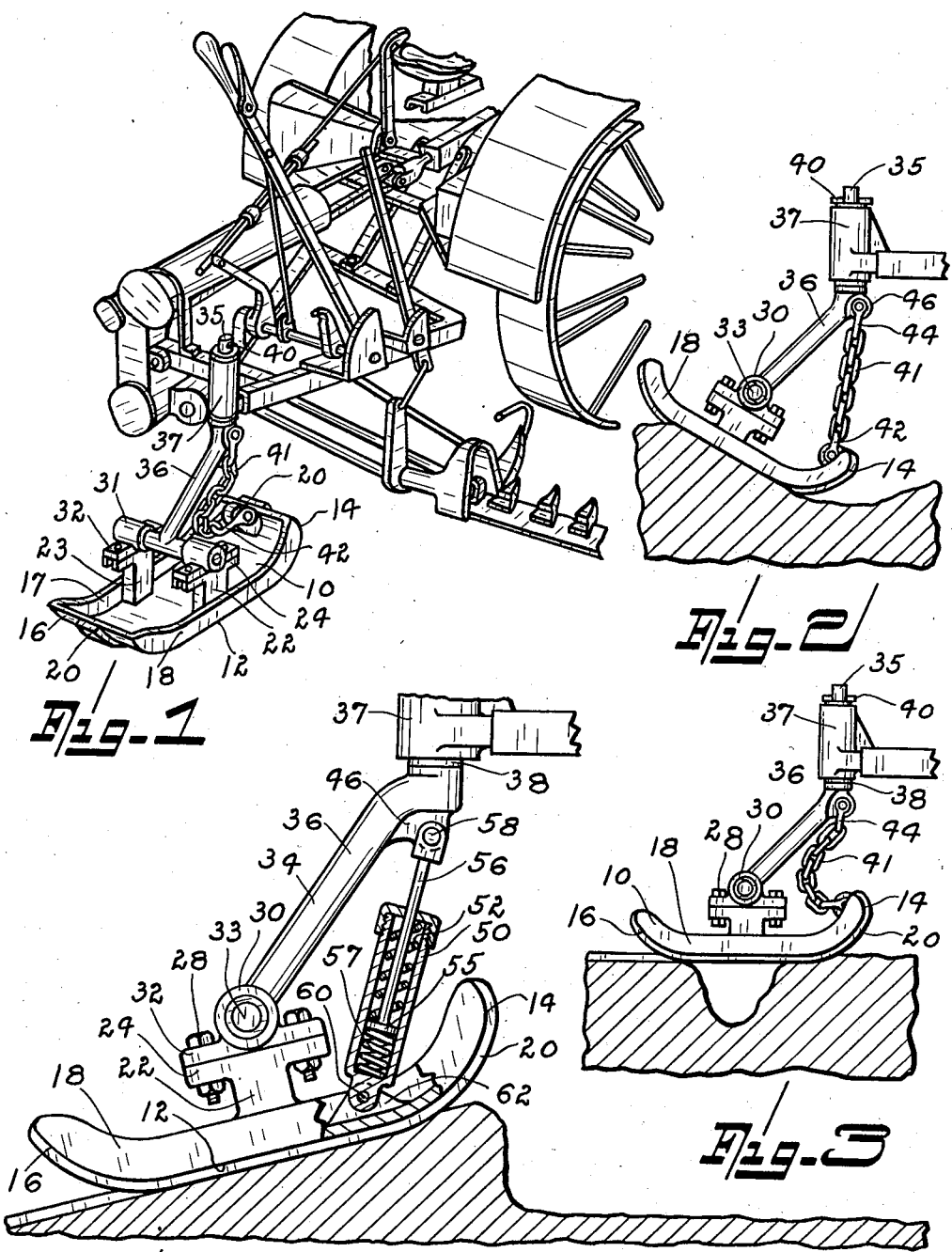

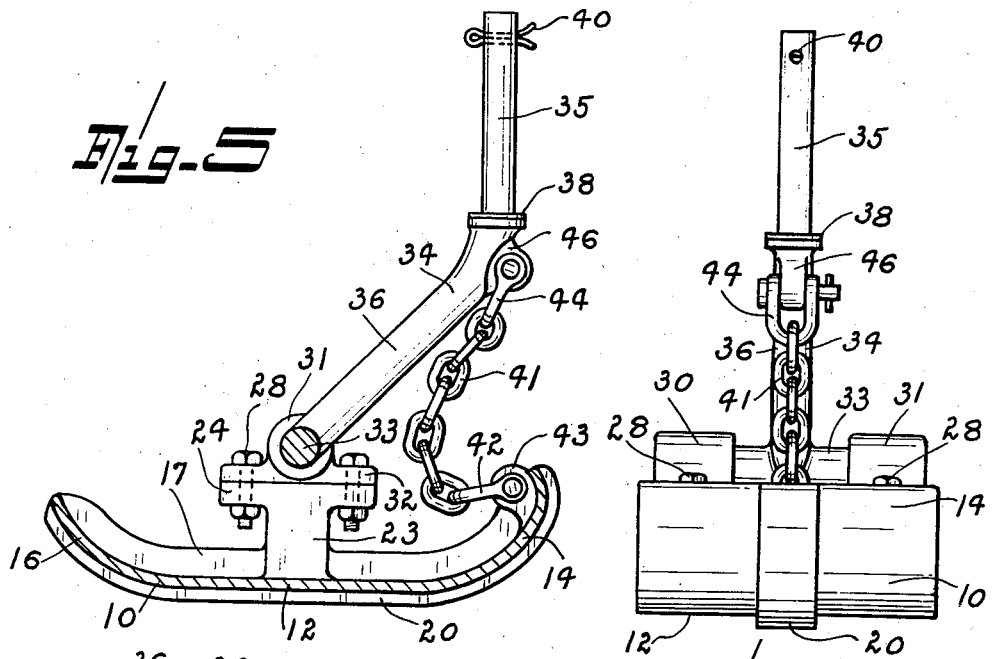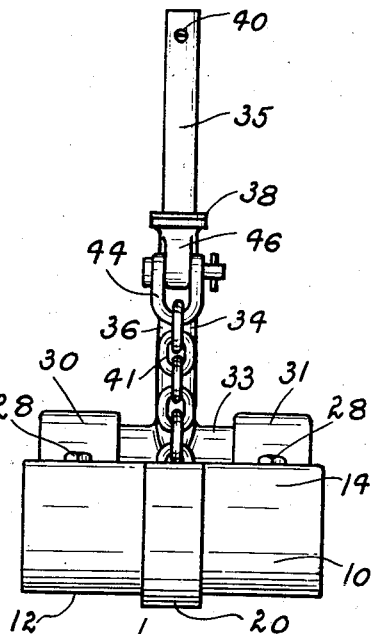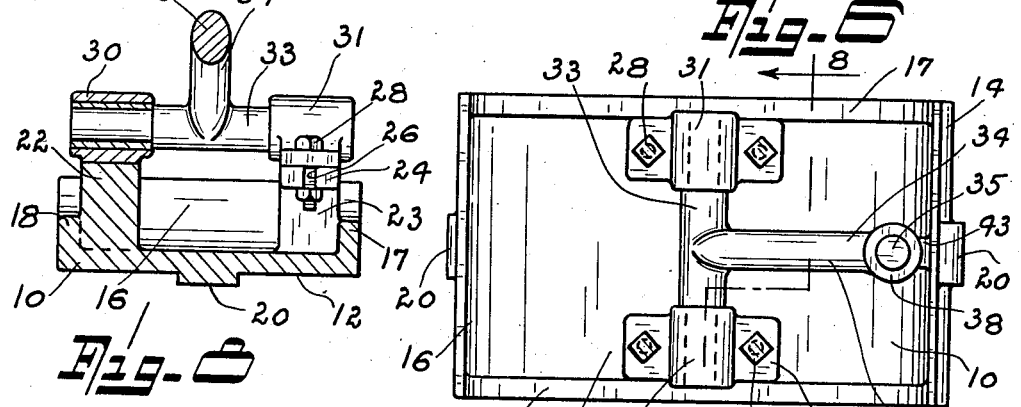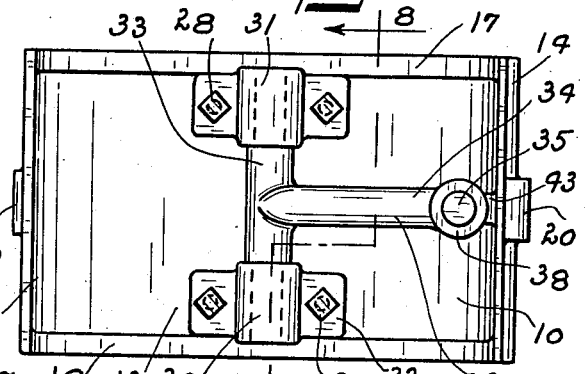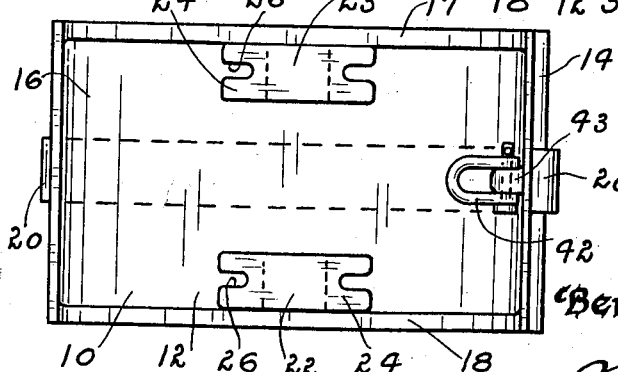

2,228,538

UNITED STATES PATENT OFFICE 2,228,538

CASTER RUNNER

Benjamin F. Smith, Kent, Wash.

Application March 8, 1939, Serial No. 260,636

2 Claims. (Cl. 280—14)

My present invention relates to the art of farm implements and more particularly to a caster runner for certain types of farm implements.

In order to adequately support certain farm implements, particularly those adapted for pulling behind tractors, trucks, and the like, it has been customary to provide one or more wheels that serve to fix the height of the implement above the ground and to thus make it possible to flexibly connect the implement to the pulling vehicle. Such equipment is needed with many devices. Particularly is this true when mowers, of the type used for cutting hay, grass, and grain crops are employed in fields that are rough and especially in fields that are ditched for irrigation purposes.

As a farm implement is towed across uneven ground, and particularly over narrow, but relatively deep irrigation ditches, the sharpness of the ditches produces a very destructive shock loading upon the implement causing rapid crystallization of some of the parts and elongation or distortion of others.

Usually implements of the type indicated are supported upon one or more caster wheels. In some instances it has been found desirable to have overlapping or twin wheels so as in a degree to cushion this shock. Too often, however, the devices when used on irrigated ground, although they may reduce the magnitude of the displacement of the vehicle, will increase the number of shocks to which the implement is subjected in each crossing of the irrigation ditches. This common fault of such devices observed to date is overcome through the use of my tractor skids, or caster runners.

My device consists essentially of a runner or skid so arranged that it functions essentially as does a caster wheel, it being provided with a transverse pivot axis to which is fitted an offset tractor connecting member normally formed as part of the transverse axle.

The principal object of my present invention is, therefore, to provide a tractor support runner which will ride over the ordinary narrow, but deep, irrigating ditches or furrows without transmitting any appreciable shock to the machine which it supports.

An important object of my present invention is to provide a tractor runner of the type described with a pivot point so positioned that, in passing over the uneven ground, the length of the runner in contact with the ground provides a slow change in elevation for the implement supported, instead of the quick displacements which result in the destructive shock to the implement such as is occasioned with the normal caster wheels.

Another object of my present invention is to provide an implement runner or skid having formed therein guide means that will with certainty effect the caster action so necessary in this form of operation.

A further object of my present invention is to provide means insuring that, even though my runner is pivoted on a transverse axle, the leading end of the runner will at all times be prevented from digging into the ground, particularly when passing over rough ground or ditches.

Other and more specific objects will be apparent from the following description taken in connection with the accompanying drawings, wherein Figure 1 is a perspective view showing a typical tractor mower in fragmentary outline and illustrating the manner of using my improved skid or runner in lieu of the more conventional caster wheel.

Figure 2 illustrates the use of my runner and the chain employed to limit the downward movement of the front end thereof when the mower is descending from a knoll as in passing over uneven ground.

Figure 3 illustrates the manner in which my runner will span the average irrigating ditch, or furrow.

Figure 4 shows a modified form of front connection which is particularly useful on uneven ground in that it provides a spring cushion which tends at all times to restore the front end of the skid to its normal horizontal position; certain parts are shown in section to better illustrate their construction.

Figure 5 is a side illustration of one of the forms of my runner with the supporting axle assembly, certain parts being shown in section.

Figure 6 is a front elevation of the device shown on Figure 5.

Figure 7 is a top plan view of my runner and supporting caster arm and axle.

Figure 8 is a cross-sectional view taken along the line 8—8 of Figure 7.

Figure 9 is a top plan view illustrating the runner shoe with the bearing caps of the transverse shaft removed.

Referring to the drawings, throughout which like reference characters indicate like parts, 10 designates generally one preferred form of constructing my runner. In this description I have illustrated my device as it would be if constructed of steel, either cast steel or pressed steel with, possibly, certain parts welded thereto. It consists essentially of a flat bottom portion 12 having reasonable transverse extent so that it will not place excessive pressure on the ground and at each end the runner is curved upwardly, the front or leading end being formed with a more pronounced curve at 14 than the rear end which is curved upwardly at 16. It has been found that by so curving these ends a much easier action is obtained. The runner can more readily accommodate itself to changes in the ground from the level and by having the front turned well up there is no danger of the leading end of the runner ever becoming buried in the ground. By having the runner curved up at the rear end it has been found that it will go over hummocks and the like in a manner to produce a gradual lowering of the transverse shaft and in this manner accomplishes the desired result, namely, that of providing a gradual change in elevation, as distinguished from a shock change, even when passing over the most uneven of ground.

In order to provide the maximum strength with the minimum of weight in material, I have provided upwardly extending flanges at 17 and 18. These flanges serve a further purpose in that they prevent the sides of the runner digging into the ground, particularly on curves and the like, and assist greatly in the desired caster action.

The castering of my runner is assisted by providing on its longitudinal axis a downwardly extending shoe portion 20. This should extend down sufficiently so as to form a definite runner action, similar to the runner on a sled or ice boat, for instance and, being of limited width, it serves as a keel to normally provide that the shoe, or runner, will track as a true caster.

At approximately the mid point of the runner, I provide upwardly extending bearing members 22 and 23. There are provided for ease of operation with flanges at 24 which in turn are provided with bifurcations or slots 26 which in turn provide an easy engagement for bolts 28 which secure to the upper surfaces of members 23 and 24 bearings 30 and 31. These bearings are themselves provided with flanges as, preferably, 32 which lie on flanges 24 and are secured together with a plurality of bolts 28, after the showing of the various figures.

Bearings 30 and 31 secure the transverse portion 33 of the caster shaft or caster assembly 34. The transverse assembly, following the principles of casters in general, is provided with the vertical pivot or bearing portion 35, and the rearwardly inclined, connecting portion 36 such as is probably best illustrated in Figure 5. Bearing portion 35 is disposed for free rotation within journal 37 and is secured in the same against longitudinal movement by the bearing flange at 38 and at its upper end by some convenient means as the split pin or cotter key 40 which normally passes through the shaftlike member 35 above a washer disposed on the end of journal 37.

In order to provide against any possibility of the leading end 14 of runner 12 digging into the ground, particularly when passing over inequalities therein, I have provided a flexible tie such as chain 41. This is secured at its opposite ends, one to shackle 42 which in turn has a pin passing through a lug 43 in the leading portion of the runner, and at its upper end in a second shackle 44 which is similarly secured to a lug 46 forged in member 34. By providing proper length in this chain the action shown probably best in Figure 2 is provided for, so that the front of the runner can fall only a predetermined amount.

There are times, particularly in the working of uneven ground, when it is desirable to use a means that will not only limit the movement of the front end of runner 12 but will limit it in both directions, limit its upward movement as well as its downward movement, and will tend to return it at all times to the horizontal. This arrangement is shown in Figure 4 and consists of a housing 50 that serves as a retaining and protecting means for the two opposed springs 52 and 53 which are disposed on opposite sides of a piston 55. This piston is provided with a rod 56 leading upwardly through the housing cap where it is enlarged to form the yoke sufficiently to accommodate pin 58 which passes through lug 46 which is similar in all respects to the lug used with the chain. The lower end of housing 50 is pivotally secured to the runner by having a pivot pin 60 which passes through a lug or space-lugs at 62. The action, it is believed, is best illustrated in Figure 4.

It is believed it will also be apparent that my device can be sold to the trade as a replacement unit and, with no change in the original equipment, can be easily substituted for the caster wheel assembly formerly used.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

Having thus fully described my invention, what I claim as new and desire to secure by Letters Patent is:

1. In a caster attachment for a wheeled implement having an upright swivel-bearing, the combination with a runner, a rearwardly inclined shaft having an upper integral journal in the upright swivel-bearing, said runner having rigid and elevated laterally spaced bearings, and laterally extending journals on the lower end of the shaft mounted in said bearings, of flexible means connecting the runner with the upper end of said shaft directly below and alined with the swivel bearing to limit pivotal movement of the runner on the laterally extending journals.

2. In a caster attachment for a wheeled-implement having an upright swivel bearing, the combination with a runner, a rearwardly inclined shaft having an upper integral head journaled in said upright bearing, said runner having laterally spaced rigid and elevated bearings, and laterally extending journals on the lower end of the shaft mounted in said bearings, of a perforated lug on said head at the rear of the shaft alined with and located directly below the swivel bearing, a complementary perforated lug on the runner at the rear of its bearings, a spring-housing pivoted on the runner-lug, a rod pivoted on the head-lug and having a piston-head in the housing, and opposed equalizing springs in the housing at opposite sides of the piston-head.

BENJAMIN F. SMITH.